(12) United States Patent
Quintos

(10) Patent No.: US 7,242,281 B2
(45) Date of Patent: Jul. 10, 2007

(54) SPEED CONTROL SYSTEM

(76) Inventor: Mel Francis P. Quintos, 6104 Winslow Ct., Fairfax Station, VA (US) 22039

( * ) Notice: Subject to any disclaimer, the term of this patent is extended or adjusted under 35 U.S.C. 154(b) by 94 days.

(21) Appl. No.: 10/906,523

(22) Filed: Feb. 23, 2005

(65) Prior Publication Data

US 2006/0187086 A1    Aug. 24, 2006

(51) Int. Cl.
*B60R 25/10* (2006.01)
(52) U.S. Cl. ............... 340/426.11; 340/467; 340/479; 340/933; 701/70; 701/301
(58) Field of Classification Search ........ 340/426.11, 340/467, 471, 479, 435, 436, 573.1, 425.5, 340/903, 933, 918, 925, 944; 701/301, 70, 701/117
See application file for complete search history.

(56) References Cited

U.S. PATENT DOCUMENTS

| | | | | |
|---|---|---|---|---|
| 5,448,219 A | * | 9/1995 | Yoshikawa et al. | 340/436 |
| 6,650,242 B2 | * | 11/2003 | Clerk et al. | 340/573.1 |
| 6,819,234 B1 | * | 11/2004 | Bunker et al. | 340/471 |
| RE38,870 E | * | 11/2005 | Hall | 701/301 |
| 7,095,336 B2 | * | 8/2006 | Rodgers et al. | 340/903 |

* cited by examiner

*Primary Examiner*—Davetta W. Goins
(74) *Attorney, Agent, or Firm*—Armstrong, Kratz, Quintos, Hanson & Brooks, LLP

(57) ABSTRACT

A speed control system employing a remote control system in which a vehicle is provided with a vehicle engine disabling/brake activating device capable of receiving a signal to immediately stop the vehicle when the remote control system has detected the presence of a pedestrian at a location, like a crosswalk, and the presence of the approaching vehicle. When a detector detects the presence of a pedestrian at a location, like a crosswalk, the remote control system is placed on stand-by status so that when the remote control system further receives a signal of the presence of an approaching vehicle, either due to a vehicle driving over a road safety bar or the vehicle being detected by an infrared detector, the remote control system transmits a signal to a vehicle engine disabling/brake activating device to disable the vehicle by either shutting down its vehicle engine and/or activating its brake system. The vehicle is thus stopped prior to reaching the crosswalk; thereby, allowing the pedestrian to safely traverse the crosswalk.

4 Claims, 1 Drawing Sheet

SPEED CONTROL SYSTEM

BACKGROUND OF THE INVENTION

Controlling the speed of vehicles has always been a critical safety issue, especially in populated areas (e.g., school zones, walkways leading to parking areas, or the like) where pedestrians may be vulnerable to being hit by speeding vehicles. Although traffic signs (including stop signs, speed limit signs or signs indicating the heavy presence of pedestrians) are often used within such populated areas, such signs do not provide the necessary safety precautions due to drivers' tendencies to either miss or ignore such traffic signs. The failure for drivers to slow down their vehicles in highly pedestrian populated areas creates a dangerous situation, which requires resolution.

SUMMARY OF THE INVENTION

Accordingly, it is an object of the present invention to provide a remote control system able to timely stop a vehicle prior to reaching a location on which pedestrians walk.

It is a further object of the present invention to provide a system whereby a vehicle can be stopped by remote control system prior to reaching the location on which pedestrians walk.

It is a further object of the present invention to provide a remote control system in which a vehicle is provided with a vehicle engine disabling/brake activating device capable of receiving a signal to immediately stop the vehicle when the remote control system has detected the presence of a pedestrian at a location, like a crosswalk, and the presence of the approaching vehicle.

It is a further object of the invention to provide a remote control system for use as a pedestrian safety system such that when a detector detects the presence of a pedestrian at a location, like a crosswalk, the remote control system is placed on stand-by status so that when the remote control system further receives a signal of the presence of an approaching vehicle, either due to a vehicle driving over a road safety bar or the vehicle being detected by an infrared detector, the remote control system transmits a signal to a vehicle engine disabling/brake activating device to disable the vehicle by either shutting down its vehicle engine and/or activating its brake system.

DETAILED DESCRIPTION OF THE PREFERRED EMBODIMENTS

Figure 1:
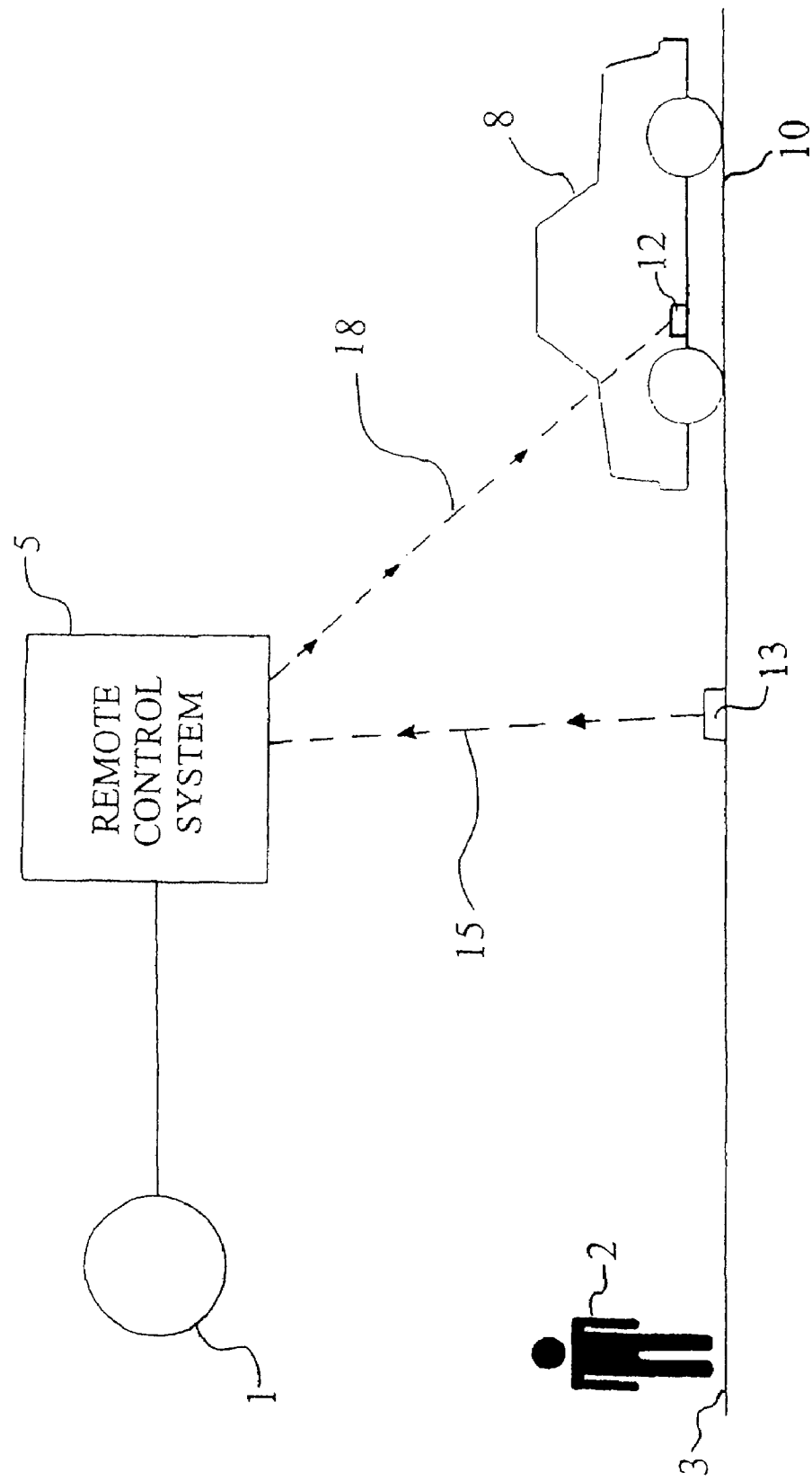
FIG. 1 shows the speed control system of this invention for controlling the speed of a vehicle for preventing collision of the vehicle onto a pedestrian.

As shown in FIG. 1, the speed control system of this invention includes a pedestrian detector 1, which can be operated by a pedestrian 2. When the pedestrian 2 crosses a, for example, crosswalk 3, he can access (by, e.g., pressing or the like) the detector. The access of the detector 1 may be physically performed (such as, the before-mentioned pressing by the pedestrian of the detector) or may be done electronically (such as, with the use of an infrared detector) for allowing the detector 1 to determine the presence of a pedestrian 2.

Upon the detection of a pedestrian 2 by the detector 1, the detector 1 transmits a signal to a remote control system 5. When the remote control system 5 receives the signal from the detector 1, due to the detector's detection of the pedestrian 2, the remote control system 5 is placed on stand-by mode ready to receive or transmit remote control signals.

A vehicle 8 being driven on a road 10 towards the direction of the crosswalk 3 has, installed therein, a vehicle engine disabling/brake activating device 12. The vehicle engine disabling/brake activating device 12 includes therein the capability of shutting down, disabling or turning OFF the engine of the vehicle 8 and activating the vehicle's brake system, and further has the capability of receiving remote control signals 18 from the remote control system 5.

A detector 13, installed on the road 10, detects the presence of the vehicle 8. The detector 13 can be, for example, a warning plate that is electrically connected to the remote control system 5. If in the configuration of a warning plate, the detector 13 can be run over by the vehicle 8; thereby, activating the remote control system 5 to operate so as to send the signal 18 to the vehicle engine disabling/brake activating device 12. Alternatively, the detector 13 may be an infrared device, which detects the presence of the vehicle 8; thereby, sending a signal 15 to the remote control system 5 for activating the remote control system 5 to operate so as to send the signal 18 to the vehicle engine disabling/brake activating device 12.

When in operation, the speed control system of this invention, is initiated when the pedestrian detector 1 detects the presence of the pedestrian 2, prior to, e.g., crossing the crosswalk 3. Such detection of the pedestrian 2 by the pedestrian detector 1 activates the detector 1 to send a signal to the remote control system 5. The signal received by the remote control system 5 from the detector 1 places the remote control system 5 in a stand-by mode ready to receive or transmit the remote control signals 15, 18.

With the remote control system 5 being at the stand-by mode, and with the vehicle 8, traveling at an undesirable speed, approaching the crosswalk 3, the vehicle 8 runs over or passes the detector 13. The detector 13 thereafter detects the presence of the vehicle 8. Upon the detection by the detector 13 of the presence of the vehicle 8, the detector transmits the signal 15 to the remote control system 5. Upon receiving the signal 15, the remote control system 5 thereafter transmits the signal 18 to the vehicle engine disabling/brake activating device 12. Upon receiving the signal 18, the vehicle engine disabling/brake activating device 12 disables the vehicle engine and activates the vehicle brake system so as to stop the vehicle 8; thereby, preventing the vehicle 8 from proceeding to the crosswalk 3 and allowing the pedestrian 2 to safely walk on the crosswalk 3.

In order to permit the remote control system 5 to transmit the signal 18 to the vehicle engine disabling/brake activating device 12 so as to disable the engine and activate the brake system of the vehicle 8 and to timely stop the vehicle, which may be traveling at an undesired speed, well before the vehicle 8 reaches the crosswalk 3, the detector 13 should be located far enough from the crosswalk 3.

The present invention is not limited to the above-described embodiments, and various modifications in design, structural arrangements or the like may be made without departing from the scope or equivalents of the present invention. For example, the detector 13, in addition to being an infrared detector, may be a safety bar extending along the road 10 electrically or mechanically connected to the remote control system 5.

The detector 13 may also be a 2-piece foldable hinge-like plate, one piece being fastened to the road 10, while the other piece being moved at an upstanding position when the remote control system 5 receives the signal from the indicator 1 due to the detection of the presence of the pedestrian 2. With this structural arrangement, the remote control system 5 and the hinge-like plate are operably connected, either mechanically or electrically. When the vehicle 8 runs over the foldable hinge-like plate 13, the other piece that has moved an the upstanding position is pushed by the tires of the vehicle 8; thereby, sending the signal 15 to the remote control system 5 indicating the presence of the vehicle 8.

What is claimed is:

1. A speed control system, comprising:
   a remote control system capable of receiving and transmitting signals;
   a first detector placed across a road for informing the remote control system of the presence of a vehicle;
   a vehicle engine disabling/brake activating device installed within the vehicle for receiving a signal from the remote control system for at least one of disabling the engine of the vehicle and activating the brakes of the vehicle so as to stop the vehicle from traveling, wherein the first detector is a hinge-like plate.

2. The speed control system as set forth in claim 1, wherein the hinge-like plate has two pieces, one piece being mounted onto the road, while the other piece is movable and, upon the detection of the pedestrian by the first indicator, the remote control system sends a signal to the hinge-like plate to move the other piece thereof at an upstanding position, the remote control system and the hinge-like plate being operably connected, either mechanically or electrically.

3. The speed control system as set forth in claim 2, wherein the other piece of the hinge-like plate, when in the upstanding position, is pushed by tires of the vehicle when run over by the vehicle, and the remote control system then detects the presence of the vehicle and sends a signal to the vehicle engine disabling/brake activating device installed within the vehicle in order to at least one of disable the engine of the vehicle and activate the brakes of the vehicle so as to stop the vehicle from traveling.

4. A speed control method, comprising the steps of:
   detecting the presence of a vehicle by a remote control system; and
   thereafter, having the remote control system send a signal to a vehicle engine disabling/brake activating device installed within the vehicle in order to at least one of disable the engine of the vehicle and activate the brakes of the vehicle so as to stop the vehicle from traveling, wherein the step of detecting the presence of the vehicle includes the step of raising a portion of a hinge-like plate on the road so that upon the tires of the vehicle running over the portion of the hinge-like plate that is raised, the remote control system sends a signal to a vehicle engine disabling/brake activating device installed within the vehicle in order to at least one of disable the engine of the vehicle and activate the brakes of the vehicle so as to stop the vehicle from traveling.

* * * * *